United States Patent [19]

Gyllenskog

[11] Patent Number: 5,633,992
[45] Date of Patent: May 27, 1997

[54] LOW-LEVEL DIRECT CONNECT FOR PCL PRINTERS

[75] Inventor: Joel H. Gyllenskog, Boise, Id.

[73] Assignee: Hewlett-Packard Company, Palo Alto, Calif.

[21] Appl. No.: 658,916

[22] Filed: May 31, 1996

Related U.S. Application Data

[63] Continuation of Ser. No. 77,180, Jun. 15, 1993.

[51] Int. Cl.$^6$ .................................................. G06F 15/00
[52] U.S. Cl. ...................................... 395/114; 395/112
[58] Field of Search ............................. 395/114, 112, 395/101, 113, 500, 110, 200.11, 200.2, 800, 200.05, 200.06, 200.09, 200.1, 200.14, 200.15, 828, 831, 834, 835; 400/61, 62, 70, 76; 347/19, 142; 358/407, 468, 296; 399/8

[56] References Cited

U.S. PATENT DOCUMENTS

| | | | |
|---|---|---|---|
| 5,220,674 | 6/1993 | Morgan et al. | 395/110 |
| 5,303,336 | 4/1994 | Kageyama et al. | 395/112 |
| 5,323,393 | 6/1994 | Barrett et al. | 370/85.8 |
| 5,371,837 | 12/1994 | Kimber et al. | 395/112 |
| 5,388,920 | 2/1995 | Ohara | 395/112 |
| 5,469,532 | 11/1995 | Gerlach et al. | 395/112 |
| 5,537,550 | 7/1996 | Russell et al. | 395/200.11 |

*Primary Examiner*—Edward L. Coles, Sr.
*Assistant Examiner*—Dov Popovici

[57] ABSTRACT

A method and apparatus for coordinating a mode of communication between a host module and a receiving module wherein a specific data string is selected which, when sent to a receiving module, specifically a printer, requests the printer to convert to a packetized data command format. If the printer is capable of communicating in a packetized format the printer converts accordingly and transmits the appropriate response to the computer. If, on the other hand, the printer is not capable of communicating in a packetized format and does not recognize the specific data string, the specific data string will be ignored by the printer as null characters.

10 Claims, 7 Drawing Sheets

LOW-LEVEL DIRECT CONNECT FOR PCL PRINTERS

This is a continuation of copending application Ser. No. 08/077,180 filed on Jun. 15, 1993.

FIELD OF THE INVENTION

The present invention generally relates to a method and apparatus for coordinating a communication mode between a host module and a receiving module, and more specifically, relates to a method and apparatus for selecting a preferred communication mode in response to a predetermined signal between a computer and a printer.

BACKGROUND OF THE INVENTION

Page Description Languages (PDL) are typically used to communicate information from a computer to a printer. This information is usually transmitted as a continuous stream data flow. The information transmitted generally includes control information and task specific information, such as text to be printed. Control information relates to the state of the printer, whereas task specific information relates to the character content of the specific print task at hand. The control information transmitted from the computer to the printer might include, but is not limited to, information related to a particular PDL being used, a printer address that identifies a specific printer on a network, a print job priority, a specific paper bin to be used, and paper feed rates. Task specific information would control the placement of ink on each page by defining the characters or dots comprising graphics that are to be printed. In this regard, an important aspect of PDL is the compatibility of the information exchange between the host computer and the receiving printer. To provide greater efficiency in exchanging data from a computer to a printer over a network, the continuous stream data is normally converted into packetized data at a network interface card. At a printer server, the packetized data is converted back to continuous stream data for input to the printer.

In a more general sense, the communication exchange between a host module and a receiving module categorically falls into either unidirectional or bi-directional modes of communication. Unidirectional data flow moves information in only one direction, commonly from the host module to the receiving module; there is little or no reverse communication of information from the receiving module back to the host module. The communication between a computer and a printer is generally unidirectional from the computer to the printer; the only information then provided the computer regarding the printer's status is a handshake signal indicating whether the printer is on-line and ready to accept data from the computer. If the printer is not ready to accept commands from the computer, the computer receives limited information from the printer regarding the cause of the communication problem.

In comparison, the bi-directional mode of communication supports informational exchanges from the host module to the receiving module and from the receiving module back to the host module. For example, if provided with bi-directional communication capability, a computer can both transmit information to a printer and receive status information from it. Bi-directional communication can facilitate greater efficiency by keeping a user fully informed about the status of a printing task, which may be particularly important when the host module and receiving module are communicating over greater distances (i.e., in different rooms or in different buildings).

However, in a bi-directional mode of communication, neither the host module nor the receiving module can intersperse control information on the "fly". In other words, if either the host module or the receiving module desires to exchange control information, it must wait until a current informational exchange has been completed. In this regard, if an error message or control information has developed during the data transfer, the error message or control information cannot be transmitted until after the current data flow has been terminated. This limitation is particularly significant if, for example, a user wishes to abruptly terminate a data transfer (i.e., a print job) before it is completed, or if a failure at the printer has occurred.

A new standard for communication between computers and peripheral devices such as printers, entitled "Standard Signaling Method for a Bi-directional Parallel Peripheral Interface" has recently been developed. An interface designed in accordance with this specification supports bi-directional communication over a communication link (cable) between the host module and the receiving module. This form of communication allows the host module and receiving module to separate control information from task specific information. However, even in such bi-directional communications, there is still no way to recognize control information that is interspersed throughout a "transmitting" data stream. Irrespective of which channel communication is occurring on, additional commands can only be sent over a channel after the termination of the current data stream on that channel. If commands were interspersed within the data stream, these commands would be ignored or result in communication errors, causing a print job to be disrupted or contain undesired characters.

Communication systems that allow the host module or receiving module to disperse commands throughout the data stream are generally categorized as packetized data command formats, and as noted above, are often used for communications over networks. These packetized formats permit intervention during the informational exchange between the host module and receiving module (or vice versa). In other words, control information, including status information, can be exchanged between the host module and receiving module asynchronous of task specific information. A data packet might generally consist of, in the case of a computer and a printer, page layout information surrounded by prefix and post-fix information that includes the form of data contained in the packet, the source of the data, the destination of the data, and, where the host module or receiving module wishes to interrupt the data communication, termination commands.

Network environments requiring communication between several satellite terminals, network printers and a variety of other network hardware and software applications typically use packetized data command formats to exchange information between the various nodes on the network. These packets contain instructional commands identifying the destination of the information (or packet) and any commands and control functions relevant to the instructional task of the packet. Since packetized data formats are more flexible, powerful, and economical, they represent a preferred form of communication between a host module and a receiving module.

If distinct and different forms of communication between a host module and a receiving module are attempted (specifically, continuous data flow—either unidirectional or bi-directional—and packetized data flow—either unidirectional or bi-directional) that are substantially incompatible because of hardware and software modifications needed to accommodate transitions from one communication mode to another, problems are likely to arise. Clearly, a communication scheme that supports transitioning from one form of communication to another will require some mechanism or method for automatically configuring the modules such that a receiving module (or a host module) designed to exchange packetized data can recognize that the host module (or receiving) module is not able to do so, and more importantly, must recognize this condition without disrupting communications between the two or causing a communication to be misinterpreted. Software attempting to communicate between modules or to cause a transition in a misconfigured environment will produce error messages, improper instructions, or faulty data exchange between the host module and the receiving module.

In this regard, there is a need for a method and apparatus to automatically recognize if a receiving module (or host module) is capable of a desired mode of communication without causing an error response in the module, and to convert that module to the desired data format if it is capable of operating in that mode, without disrupting communications in an existing and different mode.

SUMMARY OF THE INVENTION

The present invention provides an apparatus and method by which a host module (or receiving module) and a receiving module (or a host module) can determine a mode of communication which is compatible with the two modules. Specifically, the present invention determines whether the host module and the receiving module accept packetized data command formats and/or continuous stream data commands. The present invention enables the host module and the receiving module to evaluate the desired mode of communication without: (a) changing the state of the host module or the receiving module; (b) requiring either to perform a physical action; or (c) producing an error message because of incompatible commands. If the host module or the receiving module is capable of changing communication modes, the present invention converts the host module and/or the receiving module to a desired mode of communication.

Pre-selected dam commands to be transmitted from the host module to the receiving module are identified, wherein the pre-selected data commands are selected because they do not disrupt a current state of the receiving module nor create a receiving module error, and do not instruct the receiving module to perform an undesired task. The arrangement of the pre-selected data commands is compatible with an existing form of communication, but is recognized by the receiving module capable of communication in the packetized data format as a request to transition to that format. If the receiving module accepts and recognizes the request to transition to the packetized data command formats, the receiving module will respond that it can accept packetized data commands and that it is in a ready state to start a communication exchange in that format.

The present invention causes the host module to delay a predetermined time to wait for a response from the receiving module after sending the request to transition to the packetized data command format. This time is sufficient to allow the receiving module to respond to the host module that it is ready to communicate in a packetized data command format and to convert from a continuous stream data command format to a packetized data command format if the receiving module is in a continuous stream data format at the time it receives the pre-selected data commands. If the receiving module cannot operate in the packetized data command format, it ignores the pre-selected data commands.

The pre-selected data commands of the present invention are selected from commands that do not instruct a receiving module (or a host module) to alter a current state, cause it to transmit an error message, or perform an undesired task. In other words, the pre-selected data commands appear as null data to a host module or a receiving module that is not configured to acknowledge the pre-select data commands as a request to transition to a packetized data command format.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As noted above, a packetized data format represents a preferred mode of communication for exchanging information between a host module and a receiving module. While the preferred embodiment of the present invention is described as it relates to a computer (the host module) and a printer (the receiving module), it will be readily apparent to those skilled in the art that the method and apparatus of the present invention for coordinating the mode of communication between two modules can be applied to data exchanges between any type of host module and receiving module.

Figure 1:
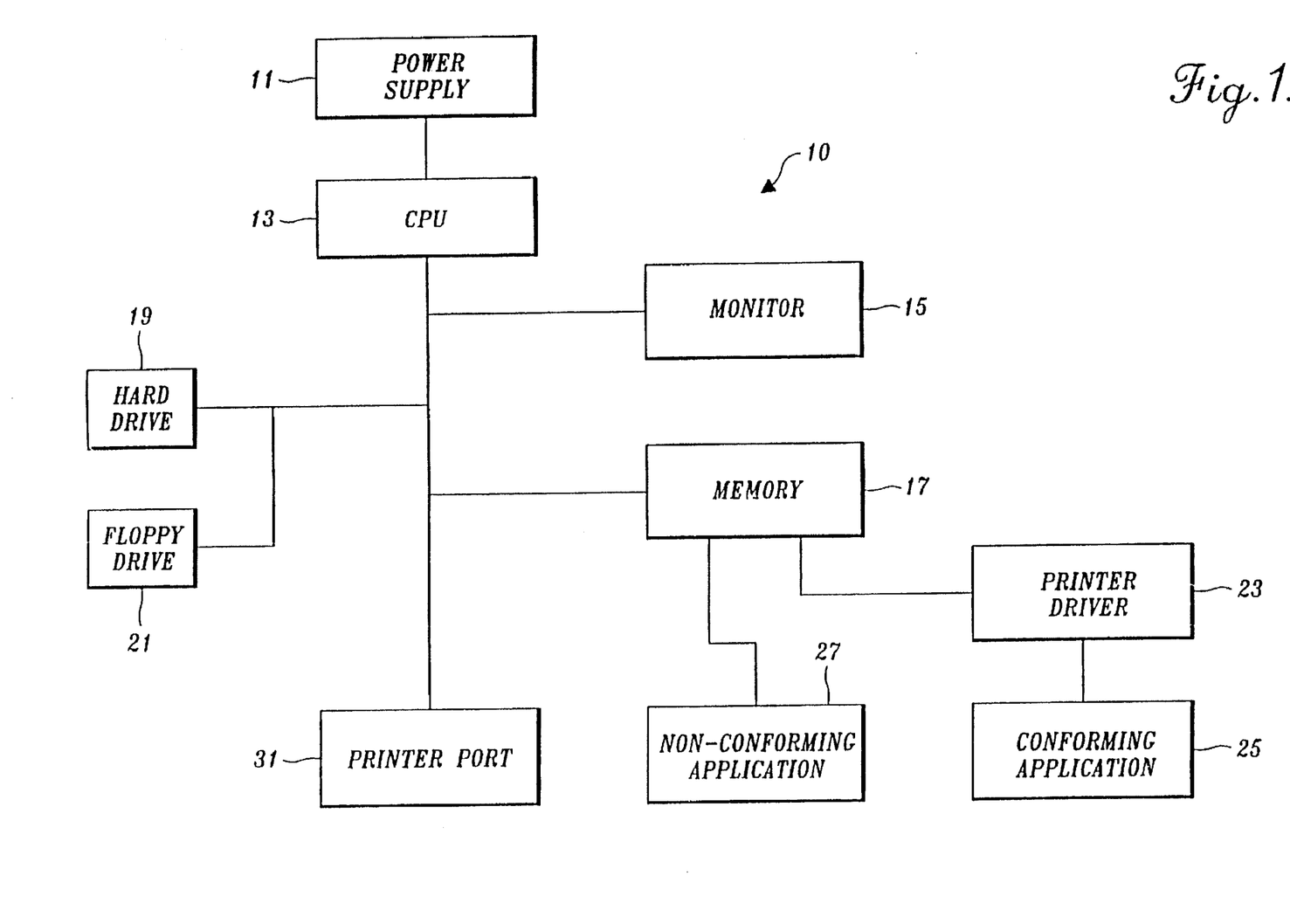
FIG. 1 is a block diagram showing hardware components of a host module and a communication link between the host module and a receiving module (printer)

FIG. 1 shows the various hardware components of a conventional computer 10 important to the communication of a computer with a conventional printer in response to a software component. The hardware components of the computer include a power supply 11, a central processing unit (CPU) 13, a monitor 15, a random access memory 17, a hard drive 19, a floppy drive 21, and a printer port 31. The software components include a printer driver 23, a nonconforming application 27, and a conforming application 25; these software components are initially stored on hard drive 19, but are subsequently loaded into the random access memory 17 when called by other software, or during bootup, when power is supplied to energize computer 10.

A software application desiring to communicate with a printer can be either a conforming application 25 or a nonconforming application 27. A conforming application 25 works through printer driver 23 to establish compatible modes of communication between the computer and the printer, and to transmit data accordingly. In comparison, a nonconforming application 27 bypasses printer driver 23 and communicates more directly to a printer through printer port 31. Nonconforming applications can be problematic in that they do not communicate with the printer through printer driver 23 and may cause errors because they do not allow device drivers (i.e., printer driver 23) to intercept and modify data flowing to the printer. Accordingly, if a nonconforming application is executed, printer driver 23 may not have the opportunity to conform the data transfer using the present invention to a desired mode of communication; more specifically, to a packetized data command format. In this respect, the nonconforming application dictates a mode of communication that is not necessarily the most effective mode that might otherwise be achieved working in accordance with the present invention. In other words, the present invention works with either conforming or nonconforming applications however a nonconforming application may not have the ability to request a conversion to a packetized mode of communication.

While a nonconforming application can incorporate the benefits of the present invention, specifically requesting the printer to convert to (or use) a packetized mode of communication, more conventional software applications (conforming application 25) communicate with a printer through printer driver 23 passing both control information and task specific information on to printer driver 23 and requesting printer driver 23 to establish a packetized data command format communication with the printer. Accordingly, printer driver 23 transmits a preselected data command, which is a recognizable packet, to the printer. The packet asks the printer to acknowledge the request and change to the packetized data command format. In this regard, the printer, if capable of recognizing packetized data, converts to a packetized mode of communication. In accordance with a preferred embodiment of the present invention, once the transmission has been completed, the printer converts back to its original status in preparation for subsequent informational exchanges. If no acknowledging response is received from the printer in a predefined time interval, the printer driver transmits control information and task specific information in a command format that does not allow asynchronous commands to be interspersed with the data, specifically a continuous stream data format, under the presumption that the printer does not have the capability to recognize the request or does not have the ability to communicate in the packetized data command format.

Computers and printers are conventionally directly linked by a multi-conductor, ribbon cable; a parallel port cable, or a serial port cable. A recent improvement in the communication link between computers and printers has been the application of "Standard Signaling Method for a Bi-directional Parallel Peripheral Interface for Personal Computer". This standard defines a signaling method for asynchronous, fully interlocked, bi-directional parallel communication between host computers and peripheral devices, specifically printers. The standard promotes bi-directional protocols, which return significant data, as well as basic status, to the computer. Accordingly, this communication protocol uses a printer driver running on the computer to manage the sending and receiving of information between the computer and the printer.

The standard communication protocol has a forward channel, which is a data path from the computer to the printer, and a reverse channel, which is a data path from the printer to the computer. The present invention is well adapted to work with the standard communication protocol, wherein, according to the present invention, the computer and the printer exchange control information over separate logical channels from the channels used to exchange task specific information.

Figure 2:
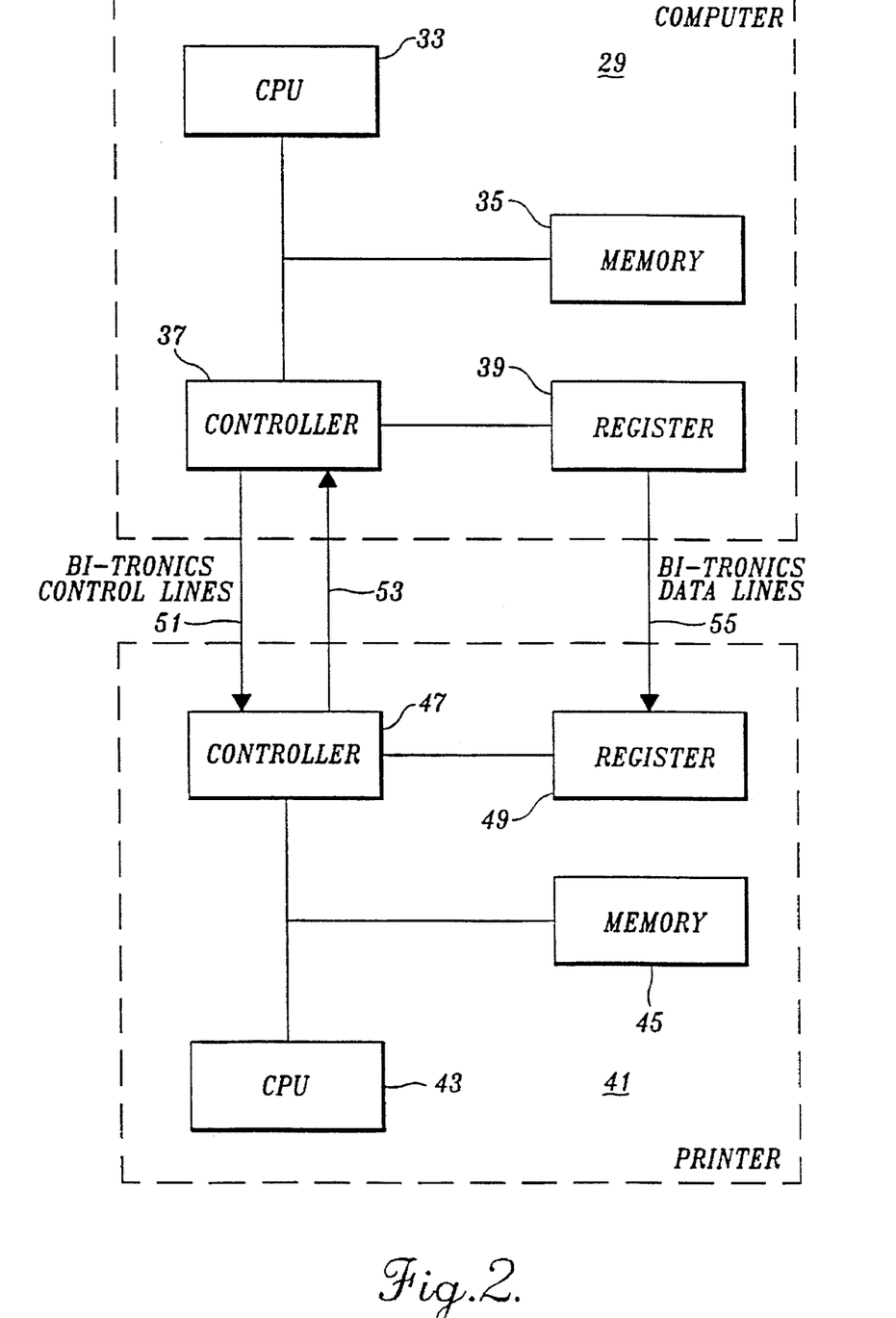
FIG. 2 is a block diagram showing the host module and receiving module hardware components typically necessary for a bi-directional communication link.

FIG. 2 shows various components comprising a communication compatible system. Specifically, a computer 29 comprises a CPU 33, a memory 35, a controller 37 and a register 39. Similarly, a printer 41 comprises a CPU 43, a memory 45, a controller 47, and a register 49. Controller 37 in the computer and controller 47 in the printer bi-directionally exchange control information across control lines 51 and 53. Task specific information is exchanged via data lines 55; specifically, there are 8 data lines 55 in the communication linkage. While a communication link other than that shown in FIG. 2 can be adapted for use with the present invention using appropriate hardware and software modifications, the communication link shown in FIG. 2 is the preferred environment for the present invention, improving both the efficiency and speed with which information (particularly control information) can be exchanged between the computer and the printer.

The preferred embodiment of the present invention selects a specific data string stored in the memory of a host module to be transmitted to a receiving module to begin the handshake operation that establishes the desired mode of communication. In the preferred embodiment of the present invention, the host module that transmits the specific data string is a computer, and the receiving module, which evaluates and responds to the specific data string is the printer. When the specific data string is received by the printer, the printer interprets the data string as a request for the printer to enter a preferred mode of communication, specifically, the packetized data command mode of communication. Preferably, the specific data string is constructed to resemble a recognizable packet format and includes multiple "Universal End of Language" characters including: <esc>, %, –, 1, 2, 3, 4, 5, and X (where <esc> represents the escape character) interspersed with "null" characters, wherein a "null" character is defined as being eight 0 bits.

When received by a printer that is not properly programmed or is otherwise incapable of recognizing the request to enter a desired mode of communication, the specific data string is ignored. Otherwise, the data string is interpreted as a request to enter the packetized data command format mode of communication. A compatible printer, upon receipt of the string, responds accordingly and completes the handshake operation to enable subsequent communication in the desired mode of communication.

Figure 5:
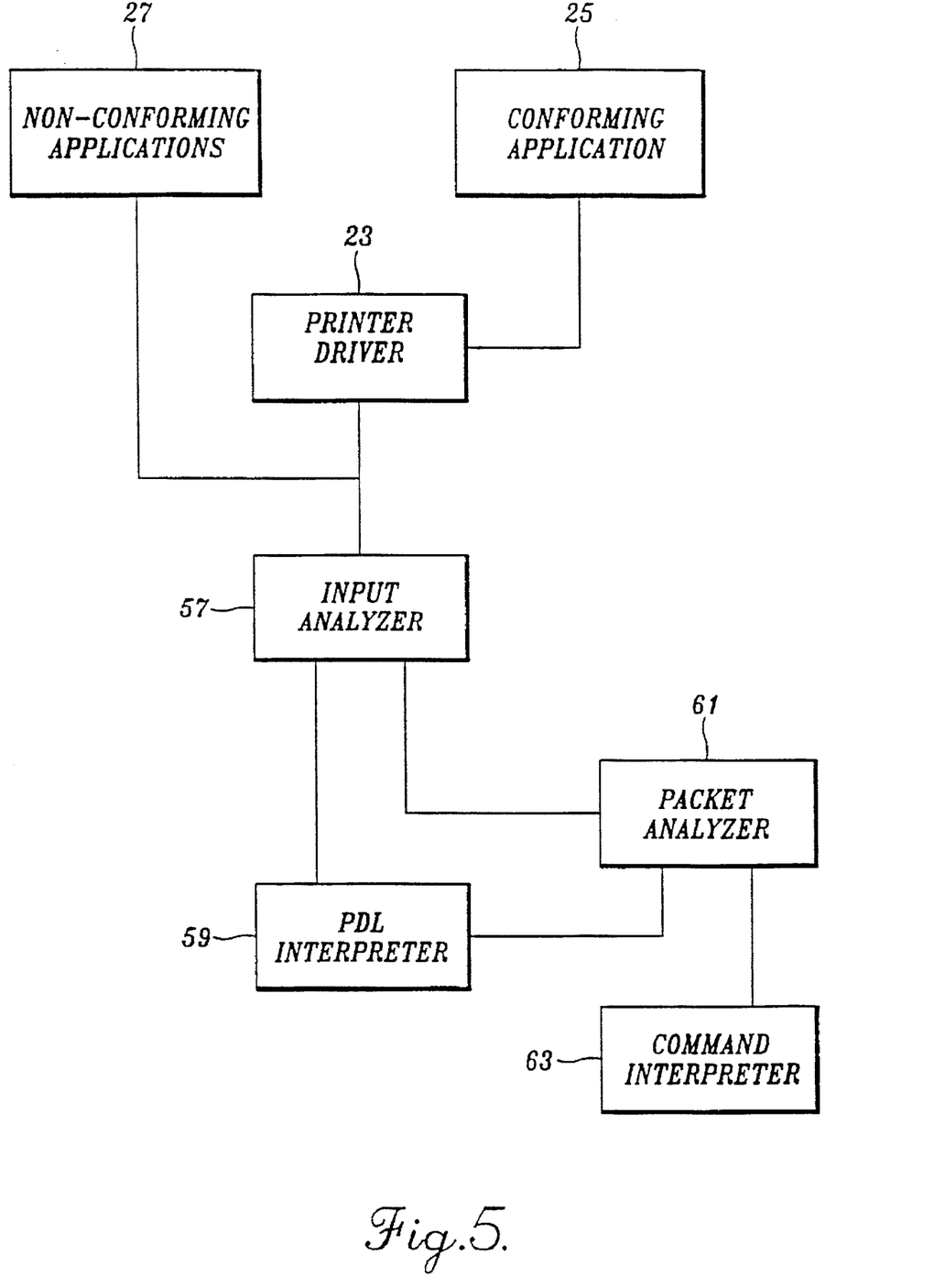
FIG. 5 is a block diagram showing the functional elements of a computer and printer linked to automatically detect a request to transition to a different data communication mode.

Referring to FIG. 5 there is shown a block diagram of the functional aspects of the present invention used to establish a desired mode of communication between computer 29 and printer 41 of FIG. 2. Printer driver 23, when accessed by a conforming application 25, transmits the specific data string comprising the Universal End of Language characters <esc>, %, –, 1, 2, 3, 4, 5, and X interspersed with "null" characters to an input analyzer 57 in printer 41. Printer driver 23 interfaces between the application program that produces the data to be transmitted to the printer. A nonconforming application 27 bypasses print driver 23 and transmits information directly to the input analyzer 57.

The input analyzer 57 examines data received and compares each character with the specific data string. Data received that does not conform to the specific data string is passed directly using continuous stream mode onto a Page Description Language (PDL) interpreter 59, which is a program running in CPU 43 of the printer that translates commands received in a printer language to marks placed on the page. If and when receipt of the specific data string is identified by the input analyzer, the input analyzer interprets this as a request to convert the printer to operate in a packetized data command format. Accordingly, the input analyzer 57 anticipates that all subsequent data received from computer 29 will be in a packetized data command format and should be passed to a packet analyzer 61 until such time as the packet analyzer sends a signal back to the input analyzer 57 indicating that the state of the channel is to be changed from the packetized data command format to a continuous stream data command format.

The packet analyzer 61 is a program running in CPU 43 of the printer that inspects packets that it receives from the input analyzer 57. Protocols defined for the packets give the packet analyzer 61 information that it uses to determine how to process the data in the packet. Packets that contain data to be printed are sent to PDL interpreter 59. Packets that contain control information are passed to a command interpreter 63.

Command interpreter 63 receives commands from the packet analyzer 61, which are executed, and the results of executing the commands are sent back to the packet analyzer 61 for transmission back to printer driver 23 in computer 29. These results can then be made available to the conforming application running on the computer.

The characters comprising the specific data string selected from Universal End of Language commands <esc>, %, -, 1, 2, 3, 4, 5, and X and interspersed with "null" characters are arranged according to Table 1 below:

TABLE 1

| CHARACTER | VALUE |
|---|---|
| $C_1$ | null |
| $C_2$ | escape |
| $C_3$ | "%" |
| $C_4$ | "—" |
| $C_5$ | "1" |
| $C_6$ | "2" |
| $C_7$ | "3" |
| $C_8$ | "4" |
| $C_9$ | "5" |
| $C_{10}$ | "X" |
| $C_{11}$ | null |
| $C_{12}$ | null |
| $C_{13}$ | null |
| $C_{14}$ | null |
| $C_{15}$ | null |
| $C_{16}$ | null |
| $C_{17}$ | null |
| $C_{18}$ | null |
| $C_{19}$ | escape |
| $C_{20}$ | "%" |
| $C_{21}$ | "—" |
| $C_{22}$ | "1" |
| $C_{23}$ | "2" |
| $C_{24}$ | "3" |
| $C_{25}$ | "4" |
| $C_{26}$ | "5" |
| $C_{27}$ | "X" |
| $C_{28}$ | null |
| $C_{29}$ | null |

Figure 6:
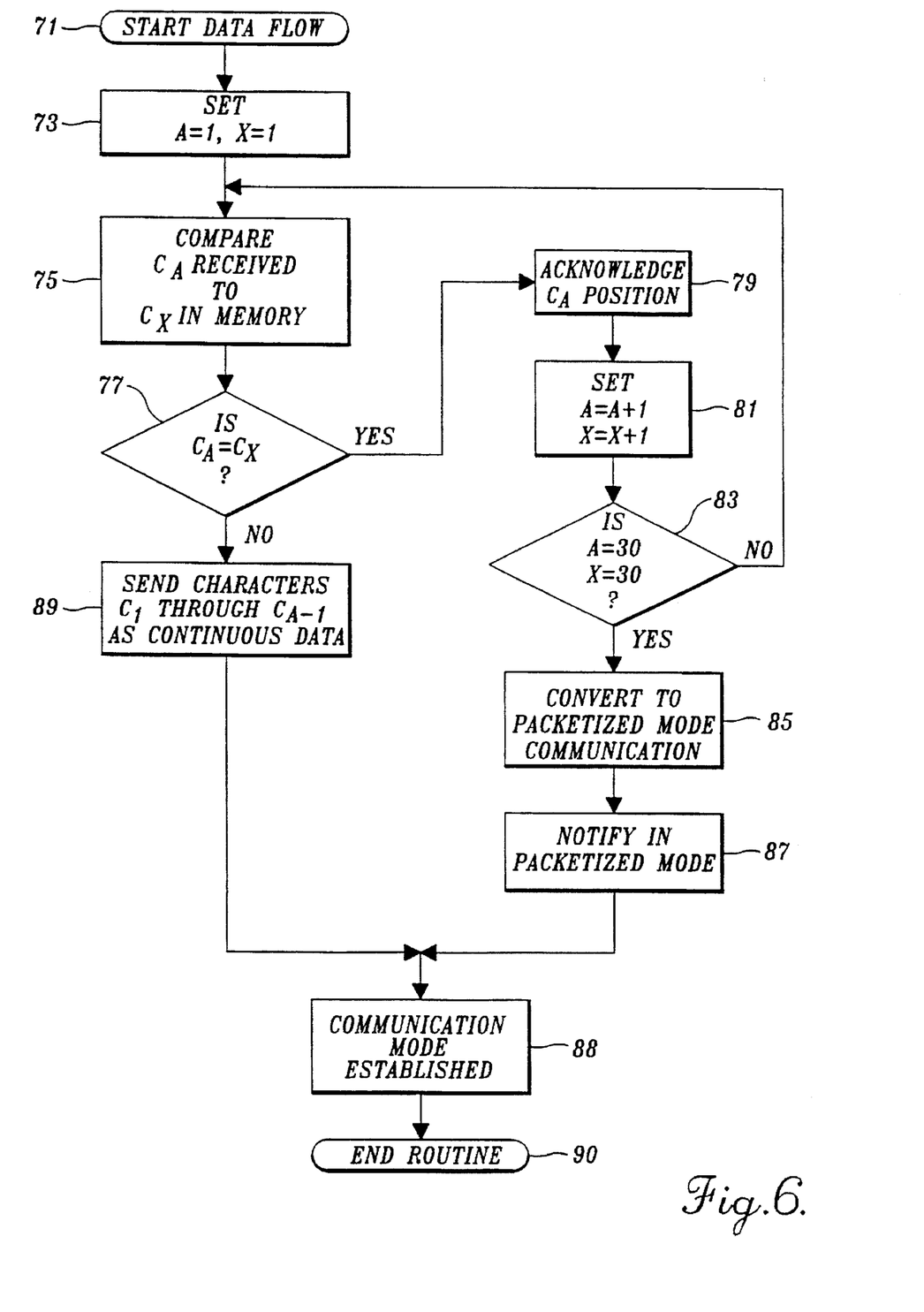
FIG. 6 is a flow diagram showing the logical steps for interpretation of specific data string commands that causes a receiving module to transition to a desired mode of communication.

Referring to the flow chart of FIG. 6, the logical steps of an algorithm are illustrated that enable a CPU to evaluate the communication mode between a host module and a receiving module. Start block 71 signifies the commencement of the evaluation. A function block 73 sets both a sequence index A, which corresponds to the character index for the sequence of characters in the received data flow, and a sequence index X, which corresponds to the index of the characters in specific predefined data string stored in memory, equal to 1, i.e., it initializes both sequences to the first character in each. Function block 75 then compares $C_A$, a received data character, to $C_X$, the corresponding specific data string character, to determine if $C_A=C_X$. If $C_A=C_X$, the receiving module stores the current $C_A$ position in function block 79 and prepares itself to evaluate the next data character in the received sequence. Accordingly, A is set equal to A+1 and X is set equal to X+1 in function block 81. Decision block 83 then determines if A=30 and if X=30. If A and X both equal 30, then the printer is converted to the packetized data mode of communication in function block 85, the printer then notifies the computer that it is in a packetized mode of communication in function block 87. Accordingly, the communication mode is established at 88 and the routine is terminated at 90. If the printer is already in a packetized data command format, function block 85 merely confirms this mode of communication to the computer in function block 87, completing the handshake operation between the computer and the printer.

Referring back to decision block 83, if A and X are not equal to 30, the loop is continued, however, A and X are now both incremented by one. The characters identified by these new index values are then compared in function block 75 and evaluated in decision block 77 to determine if $C_A=C_X$. The loop is continued until A and X equal 30, or alternatively, until a character is received which is not recognizable as part of the specific data string the printer expects to receive.

If at any point in the procedure, decision block 77 determines that $C_A$ is not equal to $C_X$, the CPU in the printer treats this as an acknowledgment that the printer is not receiving the specific data string and that characters which correspond to $C_1$ through $C_{A-1}$ are conventional data and should be passed onto the PDL interpreter 59 for processing as continuous stream data characters, in function block 89 (if A−1 is less than 1, the current character is passed onto the PDL interpreter 59). Table 2 illustrates the effect of the evaluation performed on successive characters in a received data sequence.

The Input Analyzer starts in State 1. In each of the States from 1 to 29 it gets the next input byte and changes state based on the character received. Anytime a character is received which is not part of the specific data string, characters $C_1$ through $C_{A-1}$ are sent on to the PDL interpreter as discussed above, the State becomes State 0 and the current character is evaluated. If the current character is a "null", State 0 becomes State 1 and the sequence begins again. If the current character is not a "null", the current character is sent to the PDL interpreter and State 0 becomes State 1 and the sequence begins again. In State 0 it examines the last character which was input and changes state based on the value of that character.

TABLE 2

| State | Current Character | Data send to PDL Interpreter | Next State |
|---|---|---|---|
| 0 | null | none | 2 |
| 0 | anything but null | current character | 1 |

| State | input character | Data send to PDL Interpreter | next state |
|---|---|---|---|
| 1 | null | none | 2 |
| 1 | anything but null | current character | 1 |

TABLE 2-continued

| | | | |
|---|---|---|---|
| 2 | escape | none | 3 |
| 2 | anything but escape | $C_1$ | 0 |
| 3 | "%" | none | 4 |
| 3 | anything but "%" | $C_1$ through $C_2$ | 0 |
| 4 | "—" | none | 5 |
| 4 | anything but "—" | $C_1$ through $C_3$ | 0 |
| 5 | "1" | none | 6 |
| 5 | anything but "1" | $C_1$ through $C_4$ | 0 |
| 6 | "2" | none | 7 |
| 6 | anything but "2" | $C_1$ through $C_5$ | 0 |
| 7 | "3" | none | 8 |
| 7 | anything but "3" | $C_1$ through $C_6$ | 0 |
| 8 | "4" | none | 9 |
| 8 | anything but "4" | $C_1$ through $C_7$ | 0 |
| 9 | "5" | none | 10 |
| 9 | anything but "5" | $C_1$ through $C_8$ | 0 |
| 10 | "X" | none | 11 |
| 10 | anything but "X" | $C_1$ through $C_9$ | 0 |
| 11 | null | none | 12 |
| 11 | anything but null | $C_1$ through $C_{10}$ | 0 |
| 12 | null | none | 13 |
| 12 | anything but null | $C_1$ through $C_{11}$ | 0 |
| 13 | null | none | 14 |
| 13 | anything but null | $C_1$ through $C_{12}$ | 0 |
| 14 | null | none | 15 |
| 14 | anything but null | $C_1$ through $C_{13}$ | 0 |
| 15 | null | none | 16 |
| 15 | anything but null | $C_1$ through $C_{14}$ | 0 |
| 16 | null | none | 17 |
| 16 | anything but null | $C_1$ through $C_{15}$ | 0 |
| 17 | null | none | 18 |
| 17 | anything but null | $C_1$ through $C_{16}$ | 0 |
| 18 | null | none | 19 |
| 18 | anything but null | $C_1$ through $C_{17}$ | 0 |
| 19 | escape | none | 20 |
| 19 | anything but escape | $C_1$ through $C_{18}$ | 0 |
| 20 | "%" | none | 21 |
| 20 | anything but "%" | $C_1$ through $C_{19}$ | 0 |
| 21 | "—" | none | 22 |
| 21 | anything but "—" | $C_1$ through $C_{20}$ | 0 |
| 22 | "1" | none | 23 |
| 22 | anything but "1" | $C_1$ through $C_{21}$ | 0 |
| 23 | "2" | none | 24 |
| 23 | anything but "2" | $C_1$ through $C_{22}$ | 0 |
| 24 | "3" | none | 25 |
| 24 | anything but "3" | $C_1$ through $C_{23}$ | 0 |
| 25 | "4" | none | 26 |
| 25 | anything but "4" | $C_1$ through $C_{24}$ | 0 |
| 26 | "5" | none | 27 |
| 26 | anything but "5" | $C_1$ through $C_{25}$ | 0 |
| 27 | "X" | none | 28 |
| 27 | anything but "X" | $C_1$ through $C_{26}$ | 0 |
| 28 | null | none | 29 |
| 28 | anything but null | $C_1$ through $C_{27}$ | 0 |
| 29 | null | none | 30 |
| 29 | anything but null | $C_1$ through $C_{28}$ | 0 |
| 30 | Enter packet mode and remain in packet mode until such time as a command is received indicating that packet mode should be terminated. | | |

To illustrate, in State 0 (or State 1), if the character received by the input analyzer 57 is a "null", then the character is not sent to the PDL interpreter and the input analyzer goes to the next state; State 2. In State 2, if the character received is "escape", again, the character is not sent to the PDL interpreter, and the input analyzer goes to the next state; State 3. If a "%" symbol is received, the character is not sent to the PDL interpreter and the input analyzer goes to the next state; State 4. This progression continues until State 30 is reached, wherein if input analyzer 57 has received all the characters making up the specific data string, the packet mode of communication is initialized and continues until such time as a command is received indicating the packet mode of communication is no longer valid.

If, however, in State 0 or State 1 anything but a "null" command is received, the then current character is sent to the PDL interpreter. Similarly, in State 2, if anything but "escape" is received, the previous character, which would be $C_1$, is sent to the PDL interpreter and the next state becomes State 0. If State 3 becomes the current state, and if anything but a "%" symbol is received in State 3, $C_1$ through $C_2$ are sent to the PDL interpreter and State 0 becomes the current state. This sequence processing is continuously repeated for every character received by the input analyzer according to Table 2, until such time as A and X equal 30 (i.e., State 30 is reached), wherein the mode of communication is converted to a packetized data command format. If anywhere between State 1 and State 29 a character is received that is not part of the specific data string, the previous data stored in memory are sent to the PDL interpreter, and the current state becomes State 0 to begin the sequence over again.

Figure 3A:
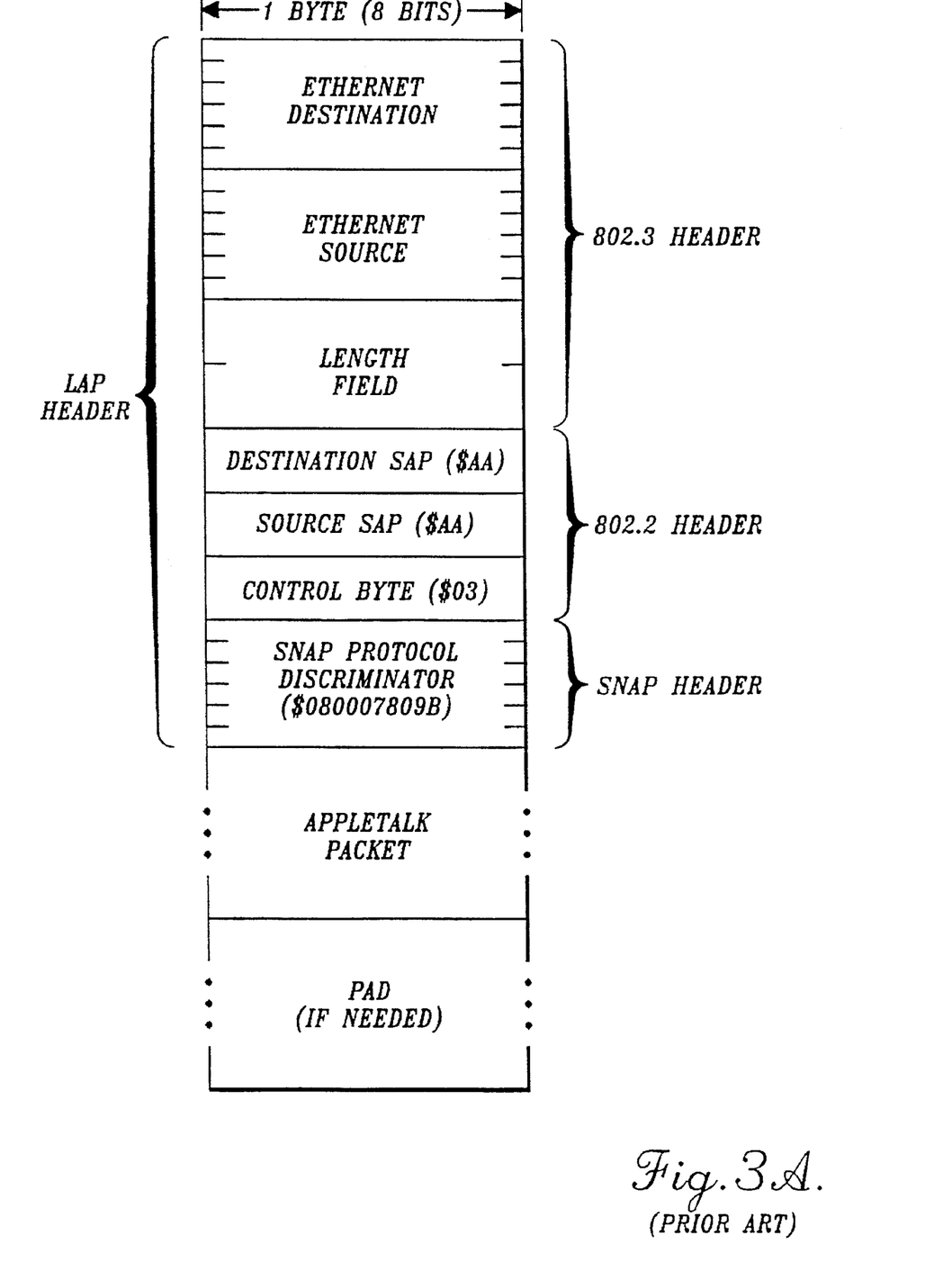
FIG. 3A is diagram showing the components of a prior art Ethernet packetized information block.

Referring to FIG. 3A, there is shown a data packet format from EtherTalk which represents a conventional packet currently in use. FIG. 3A shows the data packet format for AppleTalk™ packets on Ethernet™. A LAP header comprises a 14-byte 802.3 header followed by a 802.2 header and a snap header. The 802.3 header is an IEEE standard that specifies the format of the data-link header bytes on Ethernet. This header consists of 48-bit destination and source hardware (Ethernet) addresses and a 2-byte length field indicating the length of the data that follows. If the 802.3 header specifies that the local length of the packet is less than 60 bytes (the minimum for Ethernet), pad bytes must be added after the data to bring the packet size up to 60 bytes, but are not counted in the 802.3 length field.

Figure 3B:
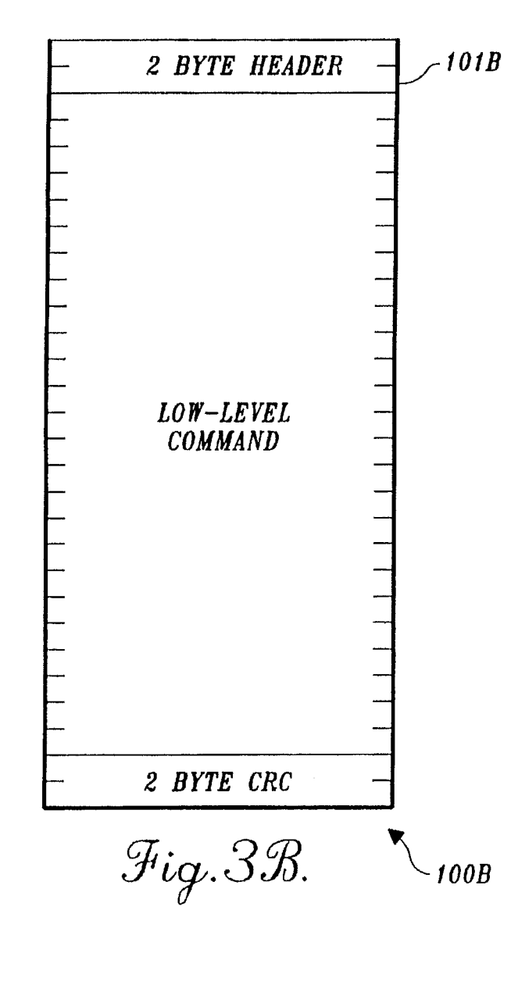
FIGS. 3B, 3C and 3D are diagrams showing the components of a packetized information block according to the protocols of the present invention.
Figure 3C:
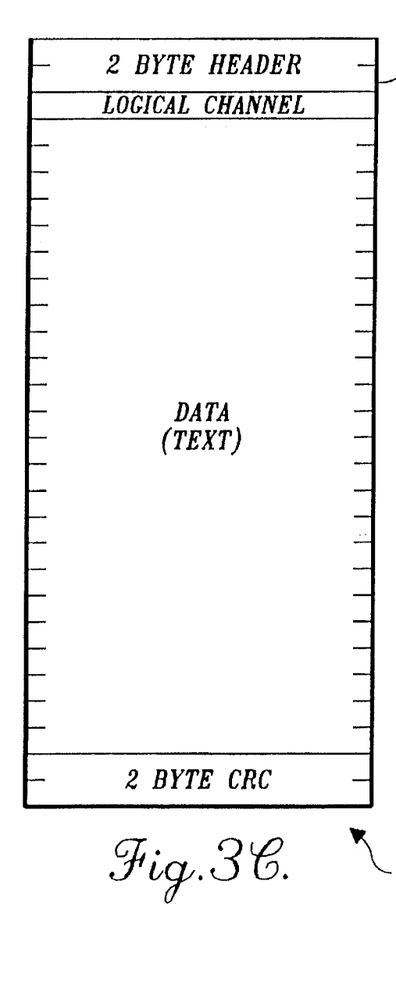
Figure 3D:
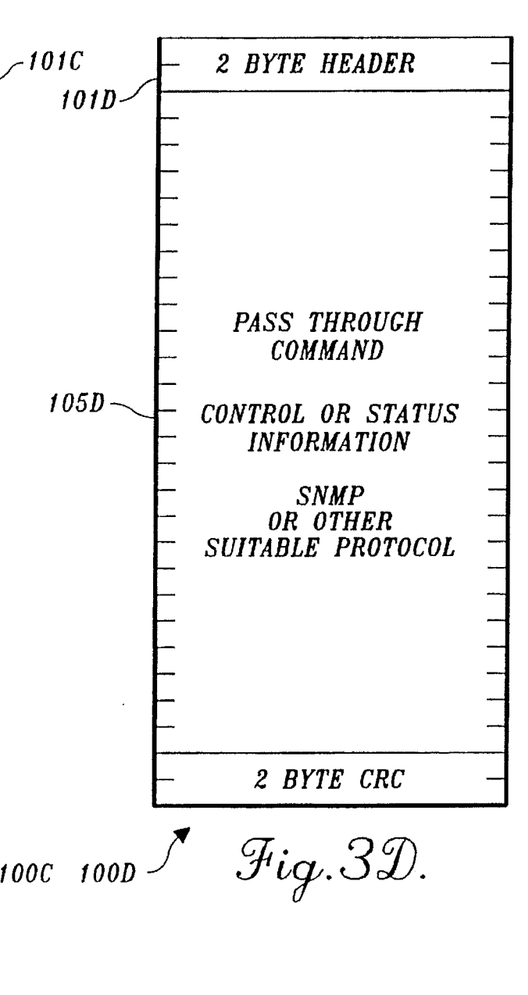

FIGS. 3B, 3C and 3D show specific packet formats that accommodate protocols for a preferred embodiment of the present invention. The packet 100B, 100C and 100D of FIGS. 3B, 3C and 3D, respectively, are characterized such that the characters in the 29 byte string represent a valid packet. The format of the 2 byte header 101B, 101C and 101D are as follows: if the first bit (the type bit) is "1", then the packet is a data packet and the next 15 bits are the length. If the type bit is a "0", then the packet is a command packet, the next bit tells what kind of command packet and the next 14 bits are the length. If the next bit following the type bit is a "0", then the command is a "low level" command used by drivers to communicate across the bi-directional channel—"low level" commands are only of interest in communication between the host module and the receiving module of the packets and are used only by the I/O subsystem and the driver; they are not passed on to the application running on the host module. If the next bit after the type bit is a "1" (as opposed to a "0"), then this is a "pass through" command (this is shown in FIG. 3D). The command field on a "pass-through" command consists of two fields: 1) a variable length address field, and 2) the actual command field 105D. A one byte field is used to hold the length of the address field, the remainder of the command field holds the actual command 105D. For "pass-through" commands the contents of the command field is to be extracted from the packet and passed to the asynchronous entity. "Pass-through" commands may be in SNMP, or any other suitable protocol.

The length field of a packet of the present invention is the number of bytes that follow the header including the CRC; the CRC will be generated using the CRC-CCITT algorithm and uses the standard CRC-CCITT polynomial: $G(x)=x^{16}+x^{12}+x^5+1$. If the sender of the packet chooses not to use the CRC, presuming the channel to be reliable, this is indicated on a packet by packet basis by putting zero into the CRC field. The two byte header field is included in the CRC.

If a host module desires to use packets over the port, then the first data sent across the channel should be the following "low level" command called sync-up:

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|
|   |   | % | - |   | 1 | 2 | 3 | 4 |   | 5 | X |   |   |   | n | n | n | n |   | n | n | n | n | e |   |   | n | n |
| n | e |   |   |   |   |   |   |   |   |   |   | n | n | n | n | n | n | n | n | u | u | u | u | s |   |   | u | u |
| u | s |   |   |   |   |   |   |   |   |   |   | u | u | u | u | u | u | u | u | l | l | l | l | c |   |   | l | l |
| l | c |   |   |   |   |   |   |   |   |   |   | l | l | l | l | l | l | l | l |   |   |   |   |   |   |   |   |   |

This is a special string which, for purposes of the preferred embodiment of the present invention, must appear as shown. This string follows the general format for a packetized "low level" command of the present invention, so that if the printer side of the I/O port is expecting packets, it will recognize this format as a valid packet, specifically, a low-level command with 27 bytes and no CRC (this would be the same 27 bytes shown in Table 1 excluding the first "null" and "escape"—$C_1$ and $C_2$— and including the last two "nulls" —$C_{28}$ and $C_{29}$—). Those skilled in the art will recognize that the binary value of the 16 bit integer formed by "null" and "escape" is 27.

The packet protocol is designed such that when the packet string is received by the receiving module, the packet string is recognized as a valid packet. The packet is treated as a packet requesting to switch to a packet mode of communication.

Figure 4A:
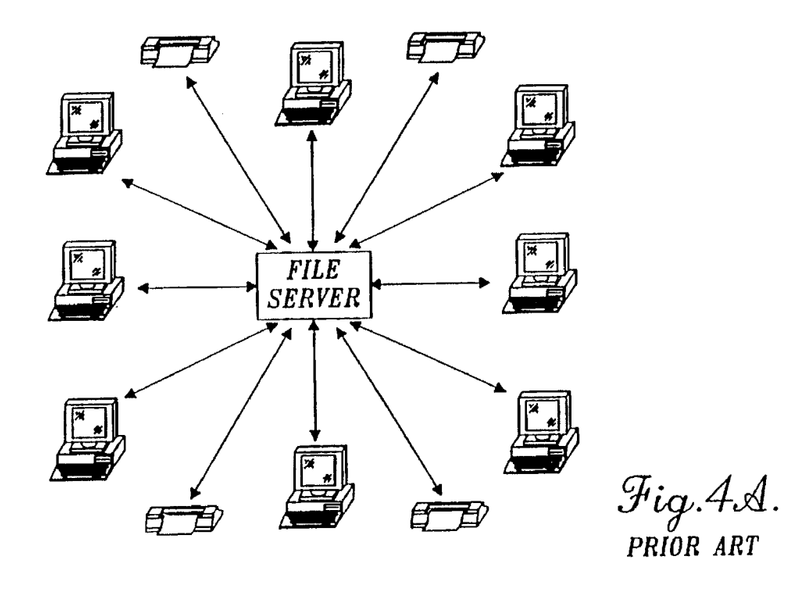
FIGS. 4A, 4B and 4C are isometric views representing a prior art star network, ring network and bus network, respectively.
Figure 4B:
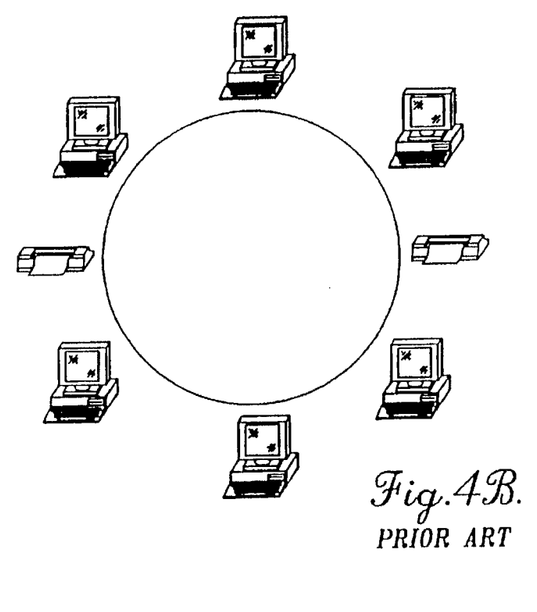
Figure 4C:
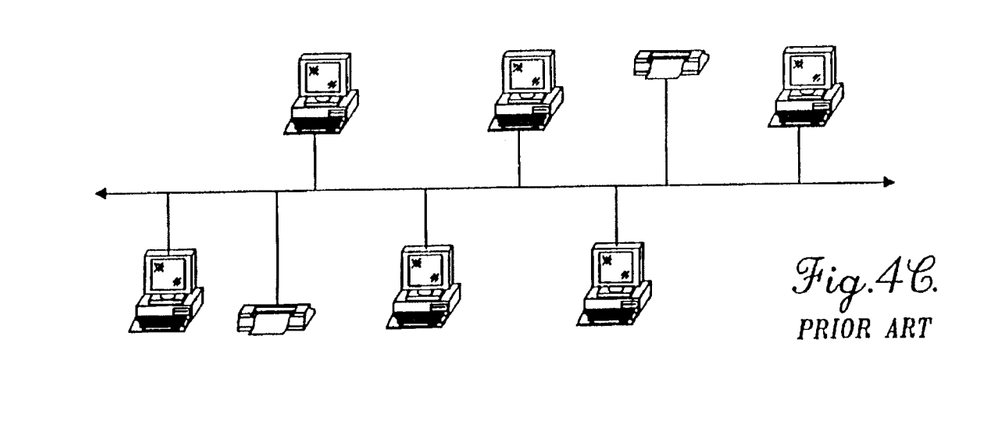

FIGS. 4A, 4B, and 4C show various network systems that conventionally use packetized data information. FIG. 4A shows the coax cabling scheme for a Star network, FIG. 4B shows the token ring cabling scheme, and FIG. 4C shows the Ethernet bus cabling scheme. Advantages to networking include the ability to share resources such as printers within the network environment. In this regard, it is essential that information being passed around on a network have a specific address and some indication of the extent of information being exchanged. Packetized data plays an important role in the communication on a network. Information being exchanged between the computer, printer and file server on a network have certain control information associated therewith; this information can include destination, length of the packet and control information specific to the device to which the packet is directed. It is important that all hardware devices and software applications be configured for network environments; specifically, that they communicate in a packetized format. In this regard, it is an important and specific intention of the present invention to have both receiving modules and host modules capable of identifying the mode of communication and convert to a more desired mode in which both are compatible.

While the preferred embodiment of the invention has been illustrated and described, it will be appreciated that various changes can be made therein without departing from the spirit and scope of the invention.

The advantage of networks, specifically the use of packetized information can be readily applied to a single host module and a single receiving module. Accordingly, each packet contains information regarding the contents of the packet and its source. This mode of communication permits commands to be interspersed on the "fly." The present invention accommodates a packetized mode of communication and allows the host module and the receiving module to convert accordingly depending on hardware and software compatibilities.

What is claimed is:

1. A method for changing from a current communication mode to a preferred communication mode between a host module and a receiving module if and only if the receiving module is compatible with the preferred communication mode, each communication mode comprising a data transfer procedure between said host module and said receiving module, said method comprising the steps of:

transmitting a specific data string from said host module to said receiving module in said current communication mode, said data string selected so as not to produce an error indication in said receiving module when said receiving module is receiving in said current communication mode;

in response to the receiving module receiving the specific data string, changing from the current communication mode to the preferred communication mode only if the receiving module signals compatibility with the preferred communication mode, said receiving module transmitting a predefined command back to said host module in the preferred communication mode to signal said compatibility with the preferred communication mode; or causing said receiving module to continue operating in said current communication mode, without an error indication, if said receiving module is incompatible with said preferred communication mode, said host module continuing in said current communication mode if said predefined command is not received from said receiving module.

2. The method of claim 1 wherein said host module is a computer and said receiving module is a printer.

3. The method of claim 1, wherein the preferred communication mode is a packetized data mode.

4. The method of claim 1, wherein the current communication mode is a continuous stream data mode.

5. The method of claim 1, wherein said specific data string is interpreted as a null sequence in the current communication mode by said receiving module, causing no change in operations of thereof.

6. A method for attempting to initiate a packetized communication mode between a host module and a receiving module, comprising the steps of:

selecting a sequence of data characters that when received by said receiving module, where said receiving module is able to operate in the packetized communication mode, indicates to said receiving module that said host module desires to initiate the packetized communication mode, said sequence of data characters interpreted as null data and ignored if received by said receiving module when said receiving module is operating in a current communication mode that is different from said packetized communication mode, and said receiving module is not able to operate in said packetized communication mode;

transmitting the sequence of data characters from the host module to the receiving module in said current communication mode; and, if said receiving module can operate in said packetized communication mode, responding to said sequence of data characters by communicating with the host module in said packetized communication mode, and if not able to operate in said packetized communication mode, continuing to communicate with the host module in said current communication mode.

7. The method of claim 6, wherein the current communication mode that is different from said packetized communication mode, is a continuous data communication mode and wherein the sequence of data characters is transmitted to the receiving module in the continuous data communication mode.

8. The method of claim 6, wherein the host module is a computer and the receiving module is a printer.

9. The method of claim 7, wherein said receiving module is able to operate in said packetized communication mode, said method further comprising the step of: causing said receiving module to transmit an indication that it has initiated communication in the packetized communication mode.

10. The method of claim 7, wherein said sequence of characters is selected from a group consisting of: <esc>, %, −, 1, 2, 3, 4, 5, and X, interspersed with null characters.

* * * * *